Nov. 20, 1956 P. V. BABEL 2,771,137

RECORD CONTROLLED PUNCH WITH PROVISION FOR SERIAL NUMBERING

Filed April 30, 1953 10 Sheets-Sheet 1

INVENTOR
PAUL V. BABEL

BY G. R. Gugger

AGENT

Nov. 20, 1956 P. V. BABEL 2,771,137

RECORD CONTROLLED PUNCH WITH PROVISION FOR SERIAL NUMBERING

Filed April 30, 1953 10 Sheets-Sheet 2

INVENTOR
PAUL V. BABEL

BY G. L. Gugger
AGENT

Nov. 20, 1956 P. V. BABEL 2,771,137

RECORD CONTROLLED PUNCH WITH PROVISION FOR SERIAL NUMBERING

Filed April 30, 1953 10 Sheets-Sheet 3

INVENTOR.
PAUL V. BABEL

BY G. R. Gugger
AGENT

INVENTOR.
PAUL V. BABEL

BY G. L. Gugger

AGENT

RECORD CONTROLLED PUNCH WITH PROVISION FOR SERIAL NUMBERING

Filed April 30, 1953

INVENTOR.
PAUL V. BABEL

BY G. R. Gugger

AGENT

RECORD CONTROLLED PUNCH WITH PROVISION FOR SERIAL NUMBERING

Filed April 30, 1953 10 Sheets-Sheet 6

INVENTOR.
PAUL V. BABEL
BY
G. R. Gugger
AGENT

Nov. 20, 1956 P. V. BABEL 2,771,137

RECORD CONTROLLED PUNCH WITH PROVISION FOR SERIAL NUMBERING

Filed April 30, 1953 10 Sheets-Sheet 7

INVENTOR.
PAUL V. BABEL

BY

G. R. Gugger
AGENT

Nov. 20, 1956 P. V. BABEL 2,771,137

RECORD CONTROLLED PUNCH WITH PROVISION FOR SERIAL NUMBERING

Filed April 30, 1953 10 Sheets-Sheet 8

INVENTOR.
PAUL V. BABEL

BY G. R. Gugger

AGENT

RECORD CONTROLLED PUNCH WITH PROVISION FOR SERIAL NUMBERING

Filed April 30, 1953 10 Sheets-Sheet 9

INVENTOR.
PAUL V. BABEL
BY G. L. Guzzer
AGENT

Nov. 20, 1956 P. V. BABEL 2,771,137

RECORD CONTROLLED PUNCH WITH PROVISION FOR SERIAL NUMBERING

Filed April 30, 1953 10 Sheets-Sheet 10

*INVENTOR.*
PAUL V. BABEL

*BY*

G. R. Gugger

AGENT

United States Patent Office 2,771,137

Patented Nov. 20, 1956

2,771,137

RECORD CONTROLLED PUNCH WITH PROVISION FOR SERIAL NUMBERING

Paul V. Babel, Vestal, N. Y., assignor to International Business Machines Corporation, New York, N. Y., a corporation of New York Application April 30, 1953, Serial No. 352,267

7 Claims. (Cl. 164—115)

This invention relates to record controlled machines, particularly to that type commercially known as a reproducer wherein suitable card perforating mechanism is arranged to gang punch records with data designating perforations and capable of utilizing one punched accounting and statistical record card to produce another such card by reproducing the first card wholly or in part. A record controlled machine of this type is disclosed in Patent Re. 21,133 which discloses the structure of the well-known "IBM" high speed reproducer. The present invention, solely as a convenience in disclosure of the invention, has been shown in the drawings and will be described hereinafter as applied to a machine of this type.

The present invention consists of an improvement enabling groups of gang punched cards to be serially number punched with the first detail card being punched under control of an emitter and the remaining detail cards being punched under control of a serial number counter.

An object is to provide means for starting the serial number punching of a group of detail cards under control of an emitter with a predetermined initial serial number. For example, it may be desired to prepare a file of detail cards comprising groups of varying numbers of detail cards, each group being serially numbered beginning with a predetermined number derived from an emitter, each of said groups having its own master card which does not contain any serial number to control the start of serial numbering operations as is now customary. As such, each master card is capable of containing a larger amount of other data which may or may not be reproduced in the detail cards as desired. For each master card, then, a related group of detail cards will be punched in serial number sequence starting with the predetermined initial number.

A further object of the invention is to provide means for automatically reproducing a starting number of 001 into the first detail card of a group and from a serial number counter punching an ascending serial number in each detail card following the "001" card until the number of cards determined by quantity punchings in a master card has been punched.

A further object is to provide means for clearing the serial number counter while reproducing the first detail card of the next group.

A further object is to provide improved means to serially number punch single card groups.

A still further object of the invention is to provide a serial number punching machine wherein controls are provided which become effective upon a mis-feed in the punch unit of the machine to enable the detail cards to be removed from the machine and the machine restarted to punch the next serial number by placing the last punched card in front of the card group to be punched so that gang punching will continue.

A further object is to provide a machine as in the preceding object including means for recognizing whether the run-in of a group of cards to be punched is an initial run-in or a run-in after a mis-feed had occurred.

Other objects of the invention will be pointed out in the following description and claims and illustrated in the accompanying drawings, which disclose, by way of example, the principle of the invention and the best mode, which has been contemplated, of applying that principle.

Figs. 8*a* to 8*d* comprise a wiring diagram.

Figure 9A:
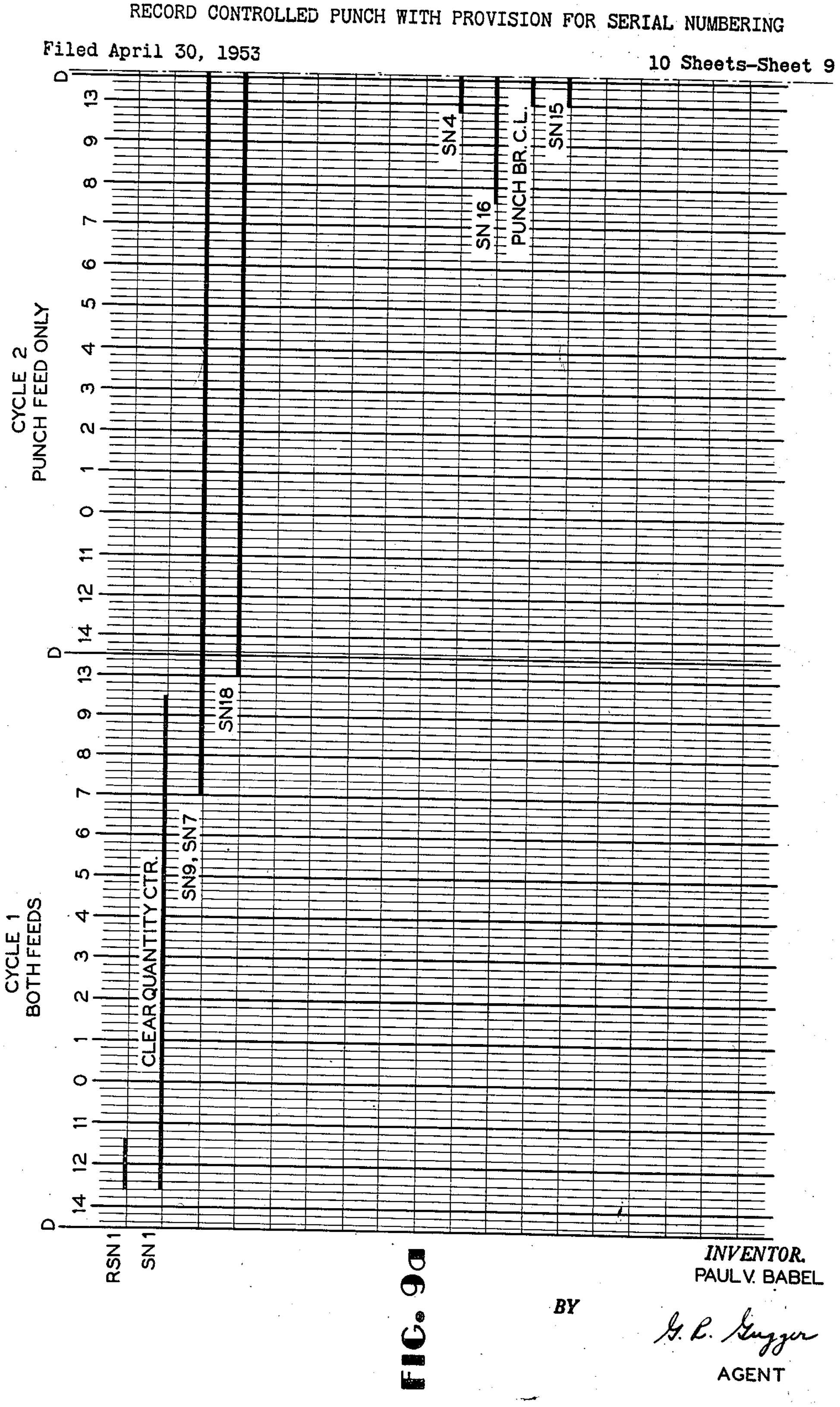
Figure 9B:
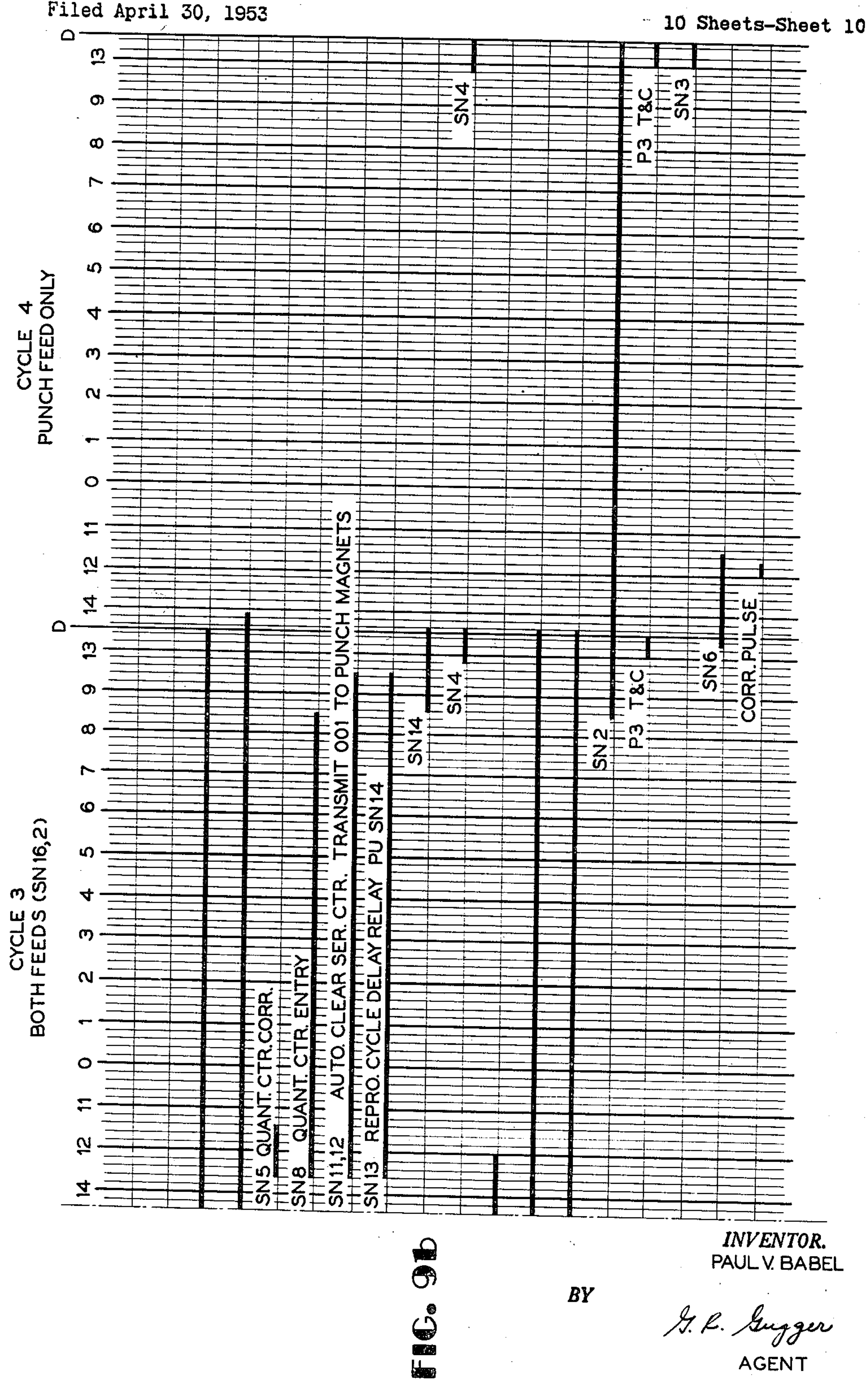

Figs. 9*a* and 9*b* comprise a timing flow chart of four cycles of operation of the machine.

PUNCHING MACHINE

Figure 1:
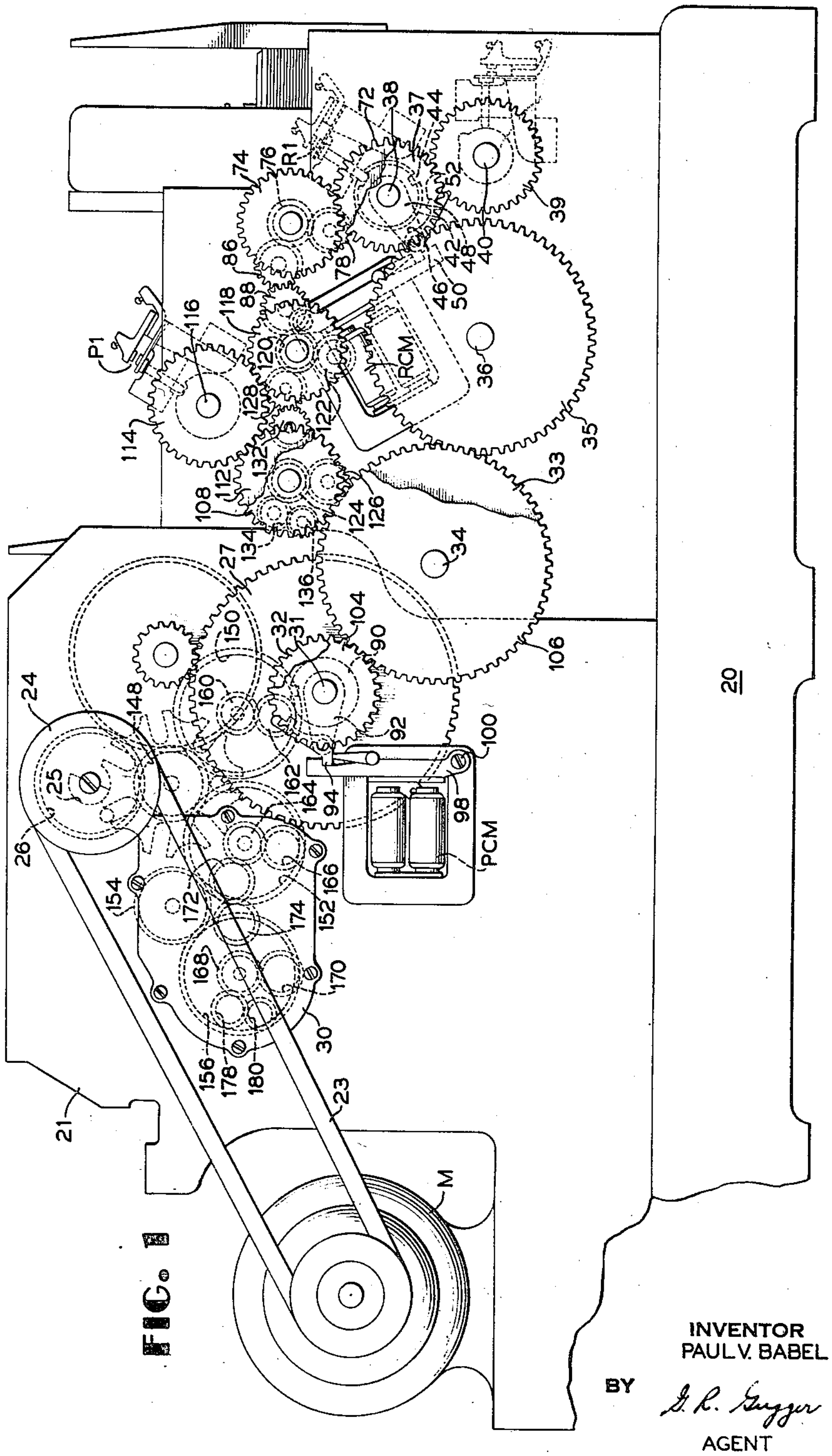
Fig. 1 is a side elevation of the machine.
Figure 2:
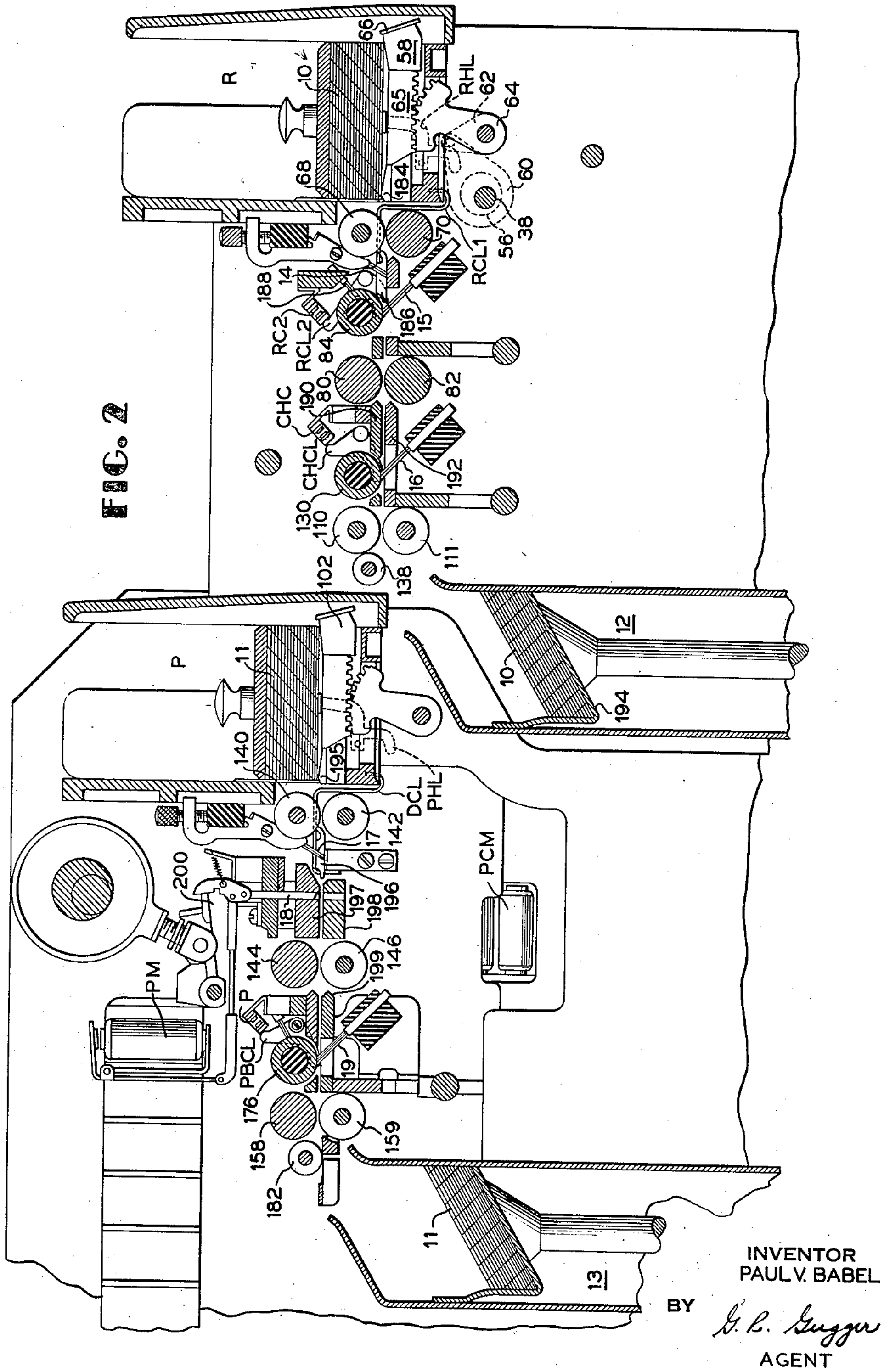
Fig. 2 is a sectional elevation view of the machine showing the feeding, sensing and perforating devices.

Referring now to the drawngs in detail, the essential working parts of a high-speed reproducing perforating machine constructed according to the principles set forth in Patent Re. 21,133, issued to C. D. Lake on June 27, 1939, are shown in Figs. 1 and 2. Reference may be had to this patent for a full and comprehensive understanding of the various machine parts and functions thereof, as well as of the operation of the device as a whole. Briefly, however, and for the purpose of illustration in connection with the present invention, a number of master cards 10 (Fig. 2) are contained in a hopper R and an additional group of blank, record or detail cards 11 are contained in a hopper P. The cards are fed singly and concurrently from both hoppers and are then shifted in synchronism through sensing and punching stations before being deposited in stackers 12 and 13.

Upon leaving the hopper R, each master card 10 first encounters a master sensing brush 14, then a line of sensing brushes 15, and finally a series of checking brushes 16. The detail cards 11 upon leaving the hopper P each pass a master sensing brush 17, then a line of punches 18 and finally a set of checking brushes 19. The brush 14 cooperates with a special perforation in the original or master card 10 and when such a perforation is sensed a class selection operation may take place to shift the sensed data to a selected field on the record or detail card. The brush 17 is used for field selection of gang punching and also for control of suspension of master card feeding when the machine is conditioned for combined gang punching and reproducing.

Electrical connections exist between the line of brushes 15 and the line of punches 18 so that when a perforation is sensed in a master card 10, a perforation is punched in the related detail card 11 in a corresponding position. After the cards have passed the first sensing and punching stations respectively, they enter separate checking stations. In these stations the master card 10 is sensed by the checking brushes 16 at the same time that the related detail card is sensed by the checking brushes 19. If the perforations in both cards do not agree, the machine is stopped and a lamp or other signal (not shown) indicates the error.

Where straight gang punching operations are concerned, the hopper R is not used and only that section of the machine to the left of the hopper P is employed. A previously punched master card is placed at the bottom of the hopper P and from there it is fed under the punches 18 and over to the brushes 19. For gang punching operations these latter brushes have a function other than checking. They are electrically connected to the punches 18 and when a perforation is sensed in a master card or a detail card following thereafter, the next following detail card is perforated by the punches 18 to duplicate the data appearing on the preceding card. In this manner an entire group or stack of cards 11 may be gang punched under the control of the single leading master card. Where gang punching operations are performed successively upon different groups of cards, a number of master cards are interspersed in the detail record cards in the hopper P. The following operations are substantially the same as with a single group, the only difference in operation being that when an interspersed master card passes under the punches 18 such a card is not punched under the control of its preceding card 11 at the end of the preceding group. For this purpose, the master sensing brush 17 is adapted to sense special perforations appearing in the master cards and prevent punching until the master card is situated in registry with the checking brushes 19.

For combined reproducing and gang punching operations, both sections of the machine are used. The cards 11 are operated upon as previously described, the only difference being that a number of the punches 18 are controlled by the master card 10 and brushes 15, while the others of the punches 18 are controlled by the gang punching master card and brushes 19. In such an instance, only certain of the brushes 16 and 19 are used for checking purposes.

Referring now to Figs. 1 and 2 wherein the driving connections of the machine are shown, a motor M is mounted above the base 20 of the machine which also carries a pair of main side frames 21. The motor is connected by a driving belt 23 to a pulley 24 on a shaft 25 suitably mounted in bearings in the frames 21. Fixed to the shaft 25 is a gear 26 which serves to drive all of the continuously running instrumentalities of the machine. Suitable gearing designated in its entirety at 30 extends between the driving gear 26 and a relatively large punch clutch driving gear 27 which is pivoted on a punch feed drive shaft 31 and attached to another driving gear 32. Gear connections are provided between the punch clutch under the hopper P and another clutch under the hopper R so that cards may be fed in synchronism from both hoppers. The gear 32 meshes with another gear 33 pivoted as at 34. This gear 33 in turn meshes with a similar gear 35 pivoted as at 36. The gear 35 meshes with a reproducer clutch driving gear 37 mounted on a shaft 38. The gear 37 meshes with a gear 39 secured to a shaft 40 and thus this latter shaft is given a continuous movement. It serves as a mounting for a number of cams cooperating with a series of cam contacts C1, C2, C5, C12 and CSN1–CSN5 hereinafter referred so, and also as a mounting for an impulse distributor wheel 28 shown in Fig. 8*b* and which constitutes an actuating device for a pair of contacts C23, the function of which will be set forth fully hereinafter.

The gear 37 (Fig. 1) has secured thereto a clutch disc 42 provided with a notch 44. Cooperating with the notch 44 is a pawl 46 mounted on an arm 48 attached to the shaft 38. One end of the pawl is engaged by an armature latch 50 and the other end of the pawl is formed with an extension 52 adapted to fall into the notch 44. A suitable spring (not shown) normally holds the armature latch 50 in engagement with the pawl 46, but when an associated magnet RCM is energized the latch is moved away from the pawl, thus connecting the shaft 38 to the driving gear 37. Shaft 38 carries a series of cams by means of which cam contacts R1, R2 and RSN1 are operated.

The shaft 38 is provided with an eccentric 56 (Fig. 2) for operating card feed picker slides 58. Encircling the eccentric is a strap 60 which receives a reciprocating motion for each rotation of the shaft 38. The strap 60 is formed with an ear pivotally attached to an arm 62 which also carries a pair of gear sectors 64. The sectors 64 mesh with racks 65 provided on the bottom of the picker slides 58 and form a driving connection therewith. The slides 58 carry a projecting picker knife 66 which is adapted to engage the bottom card in the hopper R. It is apparent from the above described connections for the reproducer clutch that when the magnet RCM is energized the picker knife 66 is moved to the right, thus bringing the bottom master card 10 in the hopper R into cooperation with a pair of feeding rollers 68 and 70. Such a feeding action occurs during each cycle of operation when the machine is employed for straight reproducing.

The feeding rollers 68 and 70 are driven by a gear 72 (Fig. 1) mounted on the shaft 38 and in mesh with a gear 74 carried on the roller 68. A smaller gear 76 on the roller 68 cooperates with a similar gear 78 on the roller 70 so that both rollers are turned simultaneously but oppositely. The rollers 68 and 70 extend across the machine between the side frames 21 and the roller 68 is slotted at various column positions to permit proper placement of the master brush 14 in any desired position. These rollers, when turning, draw a card from beneath the hopper R and feed it to the left between the brushes 14 and 15 and over into other feeding rollers 80 and 82.

A contact roller 84 is associated with the brushes 15 and is driven by gear connections from the feed roller 68, the gear 76 on the roller 68 meshing with an idler gear 86 which, in turn, meshes with a gear 88 on the contact roller 84.

The punch clutch under the hopper P is operated when connections are established between the punch feed drive shaft 31 and the punch clutch driving gear 27. Attached to the gears 27 and 32 is a notched disc 90 which is loosely mounted on the shaft 31. Adjacent the disc 90 is an arm 92 fixed to the shaft 31 and carrying a clutch pawl 94 which is pivoted thereon. The pawl has an extension adapted to fit into the notch in the disc 90 and is normally urged into engagement with the disc by a suitable spring (not shown). However, the pawl is held disengaged by an armature latch 98 which engages an extending arm on the pawl. When the punch clutch magnet PCM is energized, the associated armature is attracted and the latch 98 is rocked to the left about a pivot 100, thus releasing the pawl 94 and connecting the shaft 31 to the driving gears.

When the shaft 31 is operated, certain driving connections are rendered operative to actuate a card picker mechanism under the hopper P, which is similar to the previously described card picker mechanism under the hopper R and which is generally designated by the reference character 102. Additionally, a driving connection exists between the shaft 31 and the checking station feed rollers. A third driving connection exists between the shaft 31 and operates to release a clutch connection in a Geneva gear drive whereby intermittent motion of the card is brought about as previously described. These driving connections are not fully disclosed in the accompanying drawings, but reference may be had to the patent previously mentioned for a full disclosure thereof.

A gear 104 mounted on the shaft 31 meshes with a gear 106 mounted on the same stud 34 with the gear 33. The gear 106 meshes with a gear 108 attached to a feed roller 110. Another gear 112 on the feed roller 110 meshes with a gear 114 attached to a shaft 116 which carries a series of cams by means of which the cam contacts P1–P5, PSN1–PSN3 and PS3 are operated. The gear 114 meshes with a gear 118 attached to the feed roller 80 which also carries a small gear 120 in mesh with a similar gear 122 on the associated roller 82. A small gear 124 on the roller 110 drives a similar gear 126 on an associated roller 111. An idler gear 128 meshes with the gear 120 and drives a contact roller 130 through a gear 132 mounted thereon. Another idler gear 134 meshes with the gear 124 and serves to drive a pinion 136 mounted on a card deflecting eject roller 138.

A plurality of punch feeding rollers 140, 142, 144 and 146 are suitably geared and are driven from the driving gear 26 for feeding cards under the punch plungers 18. Suitable connections also extend from the gear 26 to the Geneva drive, previously referred to, for applying intermittent movement to the cards passing through the punching station. These driving connections are fully disclosed in the previously mentioned patent.

The connection just referred to for the Geneva drive mechanism includes a clutch between the Geneva gear wheel proper and the feed rollers so that feeding may be prevented when cards are not to be punched. The clutch mechanism is so designed that if the magnet PCM is not energized there is no driving connection to the Geneva wheel arrangement, and if this latter magnet is energized the usual driving connection is existent. A gear 148 meshes with two gears 150 and 152 on the feed rollers 140 and 144 respectively. An idler gear 154 between the gear 152 and another gear 156 forms the driving connections over to a feed roller 158 on which the gear 156 is mounted. A small gear 160 on the roller 140 cooperates with a similar gear 162 on the roller 142. The same sort of gear connection is made between a pair of gears 164 and 166 on the rollers 144 and 146 and between gears 168 and 170 on the roller 158 and its associated roller 159.

An idler gear 172 connects the gear 164 to a gear 174 on a contact roller 176. Another idler gear 178 meshes the gear 168 and a pinion 180 attached to a card reject roller 182. In the operation of the perforating machine, when a group of master cards 10 are placed in the hopper R, the bottom card depresses a hopper contact lever RHL closing the associated contacts RHC of Fig. 8*a*. Subsequently, when the picker mechanism is operated the bottom card alone is forced through the throat 184 and placed between the feed rollers 68 and 70 which feed the card along the machine.

Upon entering the sensing station, the card engages and operates a card lever RCL1. At the same time the card passes between the brush 14 and a contact plate 186. From there the card passes between the brushes 15 and the contact roller 84, and at the same time operates a card lever RCL2. Common contact brushes 188 carry the sensing current to the roller 84. The brushes 15 are arranged in a single line.

The card passes on to the feed rollers 80 and 82, which feed it between a pair of guide plates 190 and 192. A card lever CHCL is operated as the card passes between the checking brushes 16 and contact roller 130. After leaving the brushes 16, the card is engaged by the rollers 110 and 111 which serve to eject the card to the stacker 12 wherein the cards are supported on the top of a depressible spring plunger 194.

The brush 14 is adjustable along the length of the card in order that it may cooperate with any column therein.

Figure 8A:
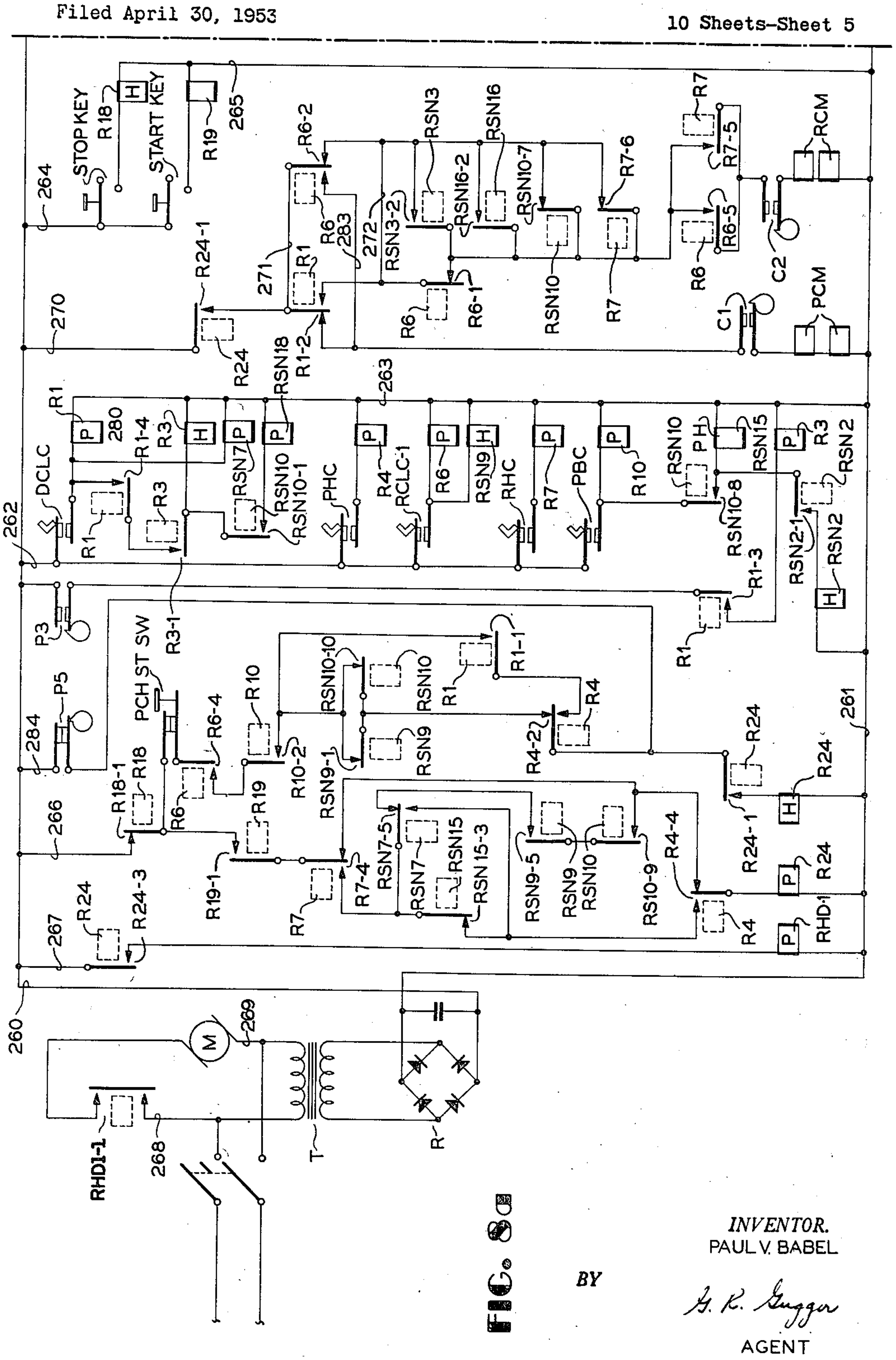

The detail cards 11 and any master cards 10 which may be placed in the hopper P follow a course through punching and sensing stations before being deposited in the stacker 13. The cards in this hopper depress the hopper contact lever PHL and close the associated contacts PHC (Fig. 8*a*). Upon operation of the picker mechanism 102, the bottom card passes through a throat 195 and is placed between the feed rollers 140 and 142 which feed the card along between the brush 17 and contact bar 196. As the card passes, it operates a card lever DCL. The brush 17 is adjustable in the same manner as the brush 14. After leaving the master card sensing station, the card is fed between a stripper plate 197 and die plate 198 and enters between the feed rollers 144 and 146, which latter rollers feed it between guide plates 199. A card lever PBCL is operated as the card passes between the sensing brushes 19 and contact rollers 176. An insulation block holds contact brushes 19 in contact with the roller 176. When the card leaves the brushes it is engaged by the rollers 158 and 159 which eject it past the deflector roller 182 into the stacker 13.

The selective operation of the punch plungers, by means of mechanism designated in its entirety at 200, is fully set forth in the previously mentioned patent and reference should be had thereto for an understanding thereof. It is deemed sufficient to state that the operation of punching is timed to occur during the pause in card feeding when the Geneva drive wheel mechanism is not in action.

ACCUMULATOR DEVICES

As was previously mentioned, the present device serially number punches groups of gang punched cards with the first detail card of each group being punched under control of an emitter and the remaining detail cards of each group being punched under control of a serial number counter. The number of detail cards that are punched for each group is controlled by a quantity counter into which quantity punchings from each master card are entered. The serial number counter and quantity counter each comprise a plurality of mechanically independent but electrically associated accumulating devices such as the one shown in Figs. 3, 4, 5 and 6. These accumulating devices are of the type disclosed in Patent 2,328,653 issued to Lake et al. on September 7, 1943, and they have been labeled in the wiring diagram (Fig. 8d) as magnets A1, S1 through A6, S6, reading from right to left, to represent the advance and stop magnets corresponding to the various digital orders of the serial numbers and quantity numbers in units, tens and hundreds. While any suitable number of these devices may be employed, depending upon the magnitude of the highest serial number to be employed for serial numbering purposes, six such accumulating devices have been disclosed in Fig. 8d, the serial number counter group and the quantity counter group consisting of three each. The accumulating devices are substantially identical in construction and it is thought that a description of one thereof will suffice for them all.

Each accumulator order is mounted on an individual plate and comprises a register device and a drive device with clutching means between them. The clutching means is controlled by a clutch lever provided on one arm with an armature disposed between advance and stop magnets. To enter a true number, the advance magnet is energized at a differential time of a cycle selected by a representation of the number on a record card. Energization of the advance magnet moves the armature and lever in a direction to cause clutching of the register device to the drive device. After being driven a differential amount equivalent to the number, a mechanical knockoff in the drive gearing restores the clutching power to declutching position, causing the register device to stop. If the number to be entered is a complement, the advance magnet is energized at a predetermined time of the cycle to initiate rotation of the registering device. At a differential time of the cycle selected by the number designation on a record card, the stop maget is energized, rocking the armature and lever in a direction opposite to the direction in which they moved by the advance magnet. As a result, the rotation of the register device is stopped after it has entered the complement of the designated number. The advance magnet is energized momentarily to move the clutch lever and armature to clutch engaging position, but the clutch lever and armature are to remain in this position until the register device is to be declutched either by operation of the mechanical knockoff or by energization of the stop magnet. For this purpose a toggle device is provided which straightens out to retain the clutch lever impositively in clutching position.

An accumulator plate unit (Fig. 3) comprises a mounting plate 201 which has fixed to it a sleeve 202 rotatably carrying a drive device comprising rigidly united ratchet 203 and gear 204. Gear 204 is continuously driven by a gear 205 fixed on a shaft 206 journaled in the side frames 21 of the machine. All of the individual accumulator plate units are mounted on the shaft 206 in this manner and a suitable driving connection (not shown) is provided between the shaft 206 and the continuously rotating shaft 40 (Fig. 1) of the punching machine. Gear 205 makes one revolution a cycle and has sixteen teeth while gear 204 has ten teeth.

Roatably carried by a hub of ratchet 203 is a disc 207 having ten teeth 208 adapted to be engaged by a tooth 209 on the long arm of a clutch lever 210 to hold the disc against rotation in a counterclockwise direction. At the side of disc 207 is a register wheel 211 rotatable on sleeve 202 and provided with ten peripheral notches 212. Wheel 211 may take any of ten rotative positions corresponding to values 0 to 9. A spring pressed lever 213 engages with a notch 212 of the register wheel to hold the wheel impositively and to center it in the value position to which it has been rotated. A transfer cam 214 is fixed to the side of wheel 211 by a pair of studs 215 and 216. These studs extend through openings of disc 207 to positions adjacent ratchet 203 where stud 215 pivotally carries a clutch dog 217 and stud 216 anchors one end of a spring 218. The other end of the spring is connected to the free end of dog 217 to urge a tooth 219 of the clutch dog to engage ratchet 203. In the positions shown in Fig. 3, the clutch lever 210 is in declutching position, its tooth 209 is restraining rotation of disc 207 counterclockwise, and clutch dog 217 is clear of ratchet 203. The clutch dog is being held clear of ratchet 203 by coaction of a pin 220 on the dog with the upper portion of a cam edge 221 of disc 207. When the clutch lever 210 is dropped to cause its tooth 209 to release the disc 207 for counterclockwise movement, the spring 218 is effective to rock the clutch dog 217 into engagement with ratchet 203. During this movement of the clutch dog, its pin 220 rides down the cam edge 221 of disc 207 and cams the disc counterclockwise until its tooth 208, previously engaged by tooth 209, is to the right of the latter tooth. The parts are then in clutching positions, shown in Fig. 5, and the register wheel 211 is coupled to the drive device 203—204 for rotation. Through engagement of the pin 220 of the clutch dog with cam edge 221, the disc 207 is forced to rotate counterclockwise together with the register wheel.

When the clutch lever 210 is returned to upper declutching position, its tooth 209 intercepts a tooth 208 of disc 207 and stops the disc. The register wheel and clutch dog continue rotating while cam edge 221 of disc 207 cams the pin 220 of the clutch dog upwardly until it is again in its outer position. As the pin 220 is cammed outwardly, clutch dog 217 moves clear of ratchet 203 and declutches the register wheel from the driving means. The register wheel is then held and centered in its new value position by lever 213.

The clutch lever 210 is held in either clutching or declutching position by a latch 222. The latch is pivoted on a stud 223 carried by an arm of a bracket 224. A spring 225 between the bracket and the latch urges the latch counterclockwise. The bracket is secured to the plate 201 by a clamping screw 226 passing through a vertical slot 227 of the bracket and threaded into the plate. A pin 228 extending from the plate freely projects into slot 227. When the screw 226 is loosened, the bracket may be adjusted vertically and slightly angularly to proper position, thereby also providing an adjustment for the tension of spring 225. With the clutch lever 210 in upper, declutching position, the wedge-shaped tip of the lever is seated firmly in a slot 229 of latch 222. When the clutch lever is moved down to clutching position, its wedge-shaped tip cams against the inclined wall of notch 229 and forces the latch clockwise until the lever tip is below and clear of the notch. The spring 225 then snaps the latch back in a counterclockwise direction, placing an inclined edge 230 thereof above the top of lever 210 to retain the lever in lower, clutching position. The free ends of the lever and latch project into a guide slot 231 formed in bracket 224 and by which sidewise movement of the lever and latch out of their proper planes is prevented. The upper, right-hand end of slot 231 also serves as a stop for the counterclockwise movement of latch 222 when clutch lever 210 is rocked downwardly and released from the notch 229 of the latch.

The clutch lever 210 has a short arm swiveled to the lower end of an armature 232. The armature is disposed between an advance magnet AM and a stop magnet SM mounted on the plate 201. Energization of magnet AM rocks armature 232 clockwise to lower the lever 210 thereby clutching in the register device for adding of true numbers. Energization of magnet SM rocks armature 232 counterclockwise to raise the lever 210 to effect the stopping of the register device when entering the complement of a true number.

The mechanical knockoff for moving the clutch lever 210 from lower to upper, declutching position comprises a lever 233 pivoted on a stud 234. A compression spring 235 normally urges the lever 233 to pivot clockwise about stud 234 thereby causing a stud 236 attached to an arm portion of said lever to ride on the periphery of a cam 237 fixed on the shaft 206. The register wheel clutch disengaging becomes effective when the stud 236 on the lever 233 enters either of the low dwells 238 or 239 of the cam. The lever 233 will be forced to pivot by action of its compression spring, causing the clutch lever 210 to engage the disc 207 and consequently stop the register wheel 211. The dwell 238 is positioned to effect mechanical knockoff at the end of the reading portion of each machine cycle, the knockoff operating between 140° and 155° on the machine index. The dwell 239 is positioned to effect mechanical knockoff after each carry impulse to the accumulator unit has caused the register wheel to add one.

ACCUMULATOR CARRY MECHANISM

Figure 3:
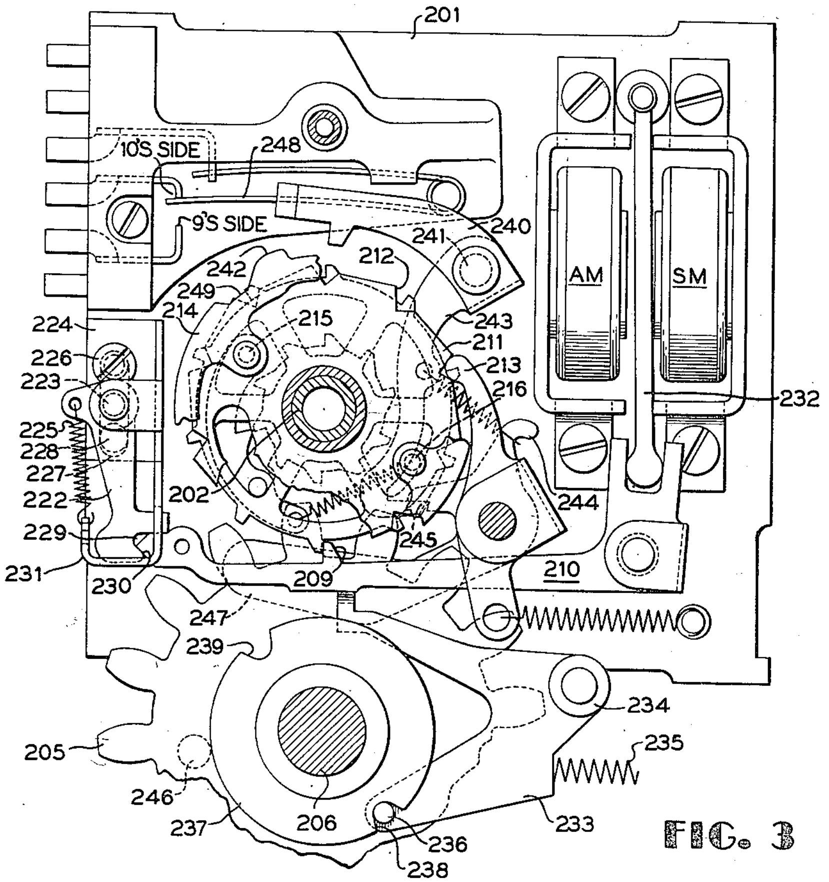
Fig. 3 is a sectional view of the accumulator plate unit, showing the declutched condition of the parts.
Figure 4:
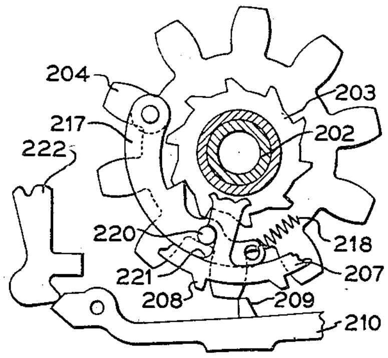
Fig. 4 is a sectional view, showing the clutched condition.
Figure 5:
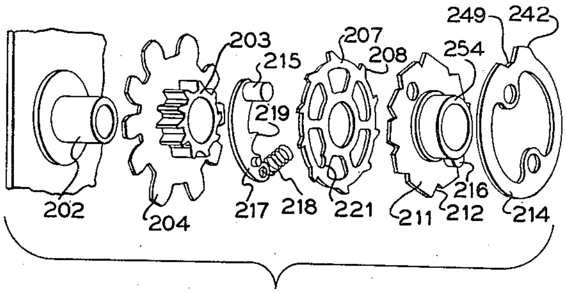
Fig. 5 is an exploded view, on a reduced scale, of the clutch.
Figure 7:
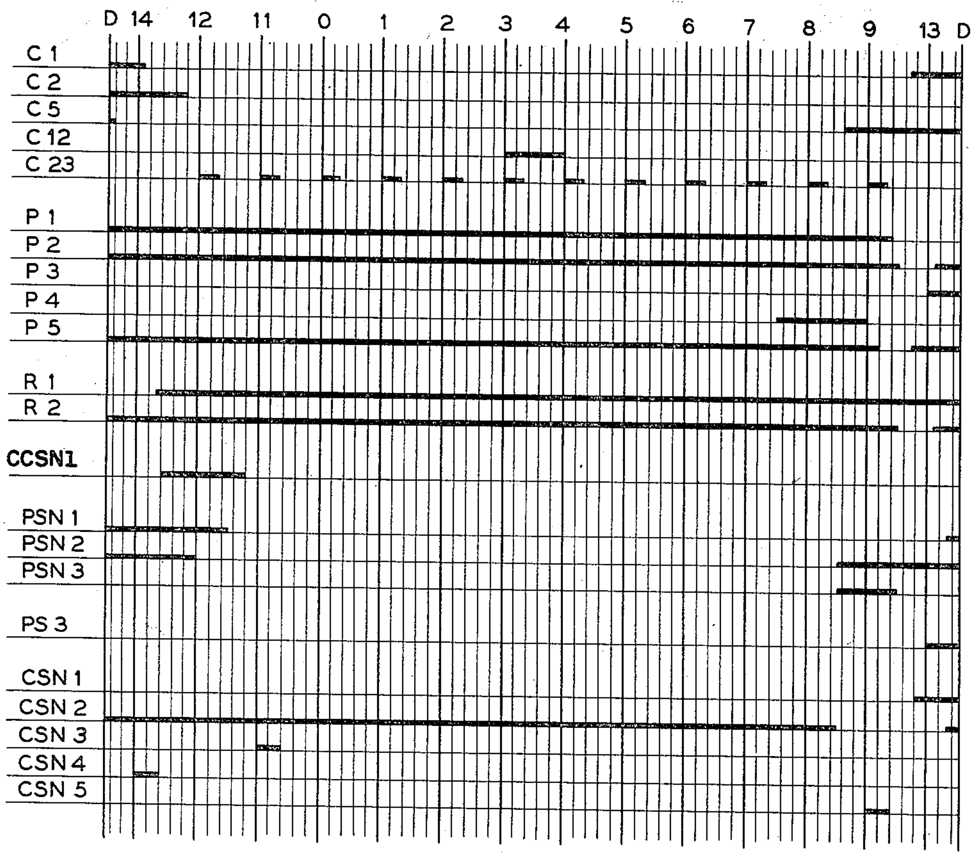
Fig. 7 is a timing chart.

The carrying from one accumulator order to the next is carried out in a well-known manner, and by circuits to be later described, under control of a normally open 9–10 contact associated with each register wheel. A carry is indicated by the register wheel when it passes from 9–0 to close and latch the 9–10 contact on the 10's side as shown in Fig. 3. A 9–10 contact lever 240 pivoted on a stud 241 is cammed clockwise by a lobe 242 on the transfer cam 214 to close the 9–10 contact on the 10's side as the register passes from 9–0 and as the contact lever moves clockwise and arm 243, integral with said lever, also moves clockwise allowing a spring operated latch lever 244 to get behind the hook-shaped end 245 of the arm and latch the 9–10 contact closed on the 10's side for the duration of the carry cycle. A stud 246 on the drive gear 205 acts upon the surface 247 of latch lever 244 to restore same after carry time and release the 9–10 contact lever, permitting the contact brush 248 to assume a neutral position at the end of each machine cycle. Cam 214 also has a recess 249 which reverses the operattion of the contact lever 240 and allows the contact brush 248 to transfer to the 9's side whenever the register wheel stands at 9.

ACCUMULATOR READ-OUT MECHANISM

Figure 6:
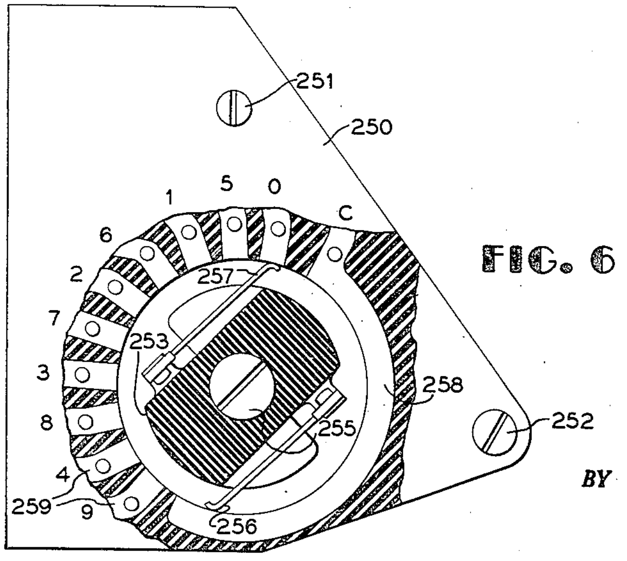
Fig. 6 is a view showing the details of the digit readout unit.

Referring to Fig. 6, there may be seen a well-known type of accumulator digit read-out unit. These units are of the commutator type and there is one provided for each accumulator plate unit. Each read-out unit comprises a moulding plate 250 of insulating material which is suitably fastened to the front side (looking at Fig. 1) of each accumulator plate unit by screws 251, 252. The plate 250 is, therefore, stationary with respect to a rotatable wiper structure 253 which is mounted on a sleeve 254 of the register wheel 211 and retained thereon by means of screw stud 255 for rotation with said wheel 211. The wiper structure consists of a pair of wipers 256 and 257, one of which makes contact with a common conducting segment 258 as the other wiper makes contact with digit representing contact segments 259 which are carried by the moulding plate 250. The wipers 256, 257 are not diametrically opposite, but are displaced an amount so that wiper 256 serves as the common while the register wheel moves from 0 to 4 with wiper 257 contacting the corresponding segments 259 and wiper 257 serves as the common for the digits 5 through 9 as wiper 258 contacts the corresponding segments 259. There is a diagrammatic showing in Fig. 8*b* of the readout for the serial number accumulator group and associated electrical connections. Emitter EM shown in Fig. 8*b* transmits a series of differentially timed impulses to the digit representing contact points to thereby transmit differentially timed digit representing impulses selected according to the contact segment 259 contacted by a wiper, to punch magnets PM to punch the serial number in each detail card.

ELECTRICAL CONNECTIONS

The electrical connections between the devices of the machine may be studied by reference to the wiring diagram shown in Figs. 8*a* to 8*d*. The present description will be concerned with the use of the machine for combined reproducing and gang punching operations wherein both sections of the machine are used. In the operation of the improved serial punching device comprising the present invention, the first detail card in the punch unit of the machine is reproduced from a master card in the read unit and a starting number 001 is also reproduced into the first detail card under the control of a machine emitter. A quantity number is entered into the quantity counter from the master card and the read unit is stopped; then, the punch unit is operated until the required number of detail cards have been gang punched with the reproduced information and have been punched with an ascending serial number under control of the serial number counter. The serial number counter is then cleared as the first card of the next group is reproduced. The following description of the operation of the improved serial numbering features of the punching machine will be based on a master card having a quantity punching of 002 indicating that two detail cards are to be serially number punched for that master card.

*First cycle*

Referring to Fig. 8*a*, when the main switch is closed 110 volts A. C. is applied across the transformer T and rectifier R to provide a source of 40 volts D. C. across the two main lines 260 and 261 of the machine. Blank cards are inserted in the feed hopper P and the original or master cards are placed in the hopper R. The cards in hoppers P and R operate the respective hopper levers PHL and RHL, closing contacts PHC and RHC, and energizing relays R4 and R7 by a circuit which extends from line 260, wire 262, contacts PHC and RHC, relays R4 and R7, wire 263 and line 261. Now the start key is depressed to complete a circuit from line 260, wire 264, the start key, relay R19, wire 265 and line 261. Energization of relay R19 closes contacts R19–1 and completes a circuit from line 260, wire 266, normally closed contacts R18–1, normally open contacts R19–1, now transferred, contacts R7–4, now transferred, normally closed contacts RSN15–3, contacts R4–4, now transferred, the pick coil of relay R24 and line 261.

Upon energization of relay R24, a circuit is completed from line 260, wire 267, normally open contacts R24–3, now closed, motor relay RHD–1 and line 261. The energization of the motor relay RHD–1 closes contacts RHD1–1 and operates motor M through the 110 volt lines 268 and 269. Also a circuit is completed to the punch clutch magnet PCM and the read clutch magnet RCM. This circuit extends from line 260 (Fig. 8*a*), wire 270, contacts R24–1, now closed, the normally closed side of contacts R1–2, cam contact C1, punch clutch magnet PCM to line 261 and also from the R24–1 contacts, wire 271, the normally closed side of contacts R6–2, wire 272, normally closed contacts R6–1, contacts R7–5, now closed, the cam contact C2, read clutch magnet RCM to line 261. Through the clutch connections thus made, the punch picker is operated to feed the first detail card out of the hopper and between the first set of feed rollers 140, 142 and the read picker is operated to feed the first master card out of the hopper and between the first set of feed rollers 68, 70.

The first cycle is utilized to reset the three orders of the quantity counter to 000. As will be described hereinafter, the quantity designation which appears in the quantity field of the master card for the purpose of controlling the number of detail cards that are to be serially punched is entered subtractively into the quantity counter along with an added correction factor of one. The counter is then stepped one unit for each detail card that is serial number punched and when the required number of cards have been punched the counter will stand at 999. It is necessary, then, to reset the quantity counter to 000 at the start of a new group for entry of the new quantity designation from the next master card.

It should be mentioned at this point that the machine is conditioned for serial number punching operations by plug wiring the serial number hub SN to the "On" hub (Fig. 8*b*) to complete a circuit which extends from line 260, wire 273, hub SN, plug wire connection, "On" hub, pick coil of relay RSN10 and line 261. With the read feed operating as a result of depressing the start key, cam contact CCSN1 (Fig. 8*c*) closes at 14.4 of the first cycle and a circuit is completed from line 260, cam contact CCSN1, contacts RSN10.3, now closed, contacts RSN9.2, normally closed, wire 274, contacts RSN7.3, normally closed, the pick coil of relay RSN1 and line 261. Relay RSN1 will hold until 9.5 of the first cycle by a circuit which extends from line 260, wire 275, cam contact R2, contacts RSN1.1, now closed, the hold coil of relay RSN1, wire 276 and line 261.

Figure 8D:
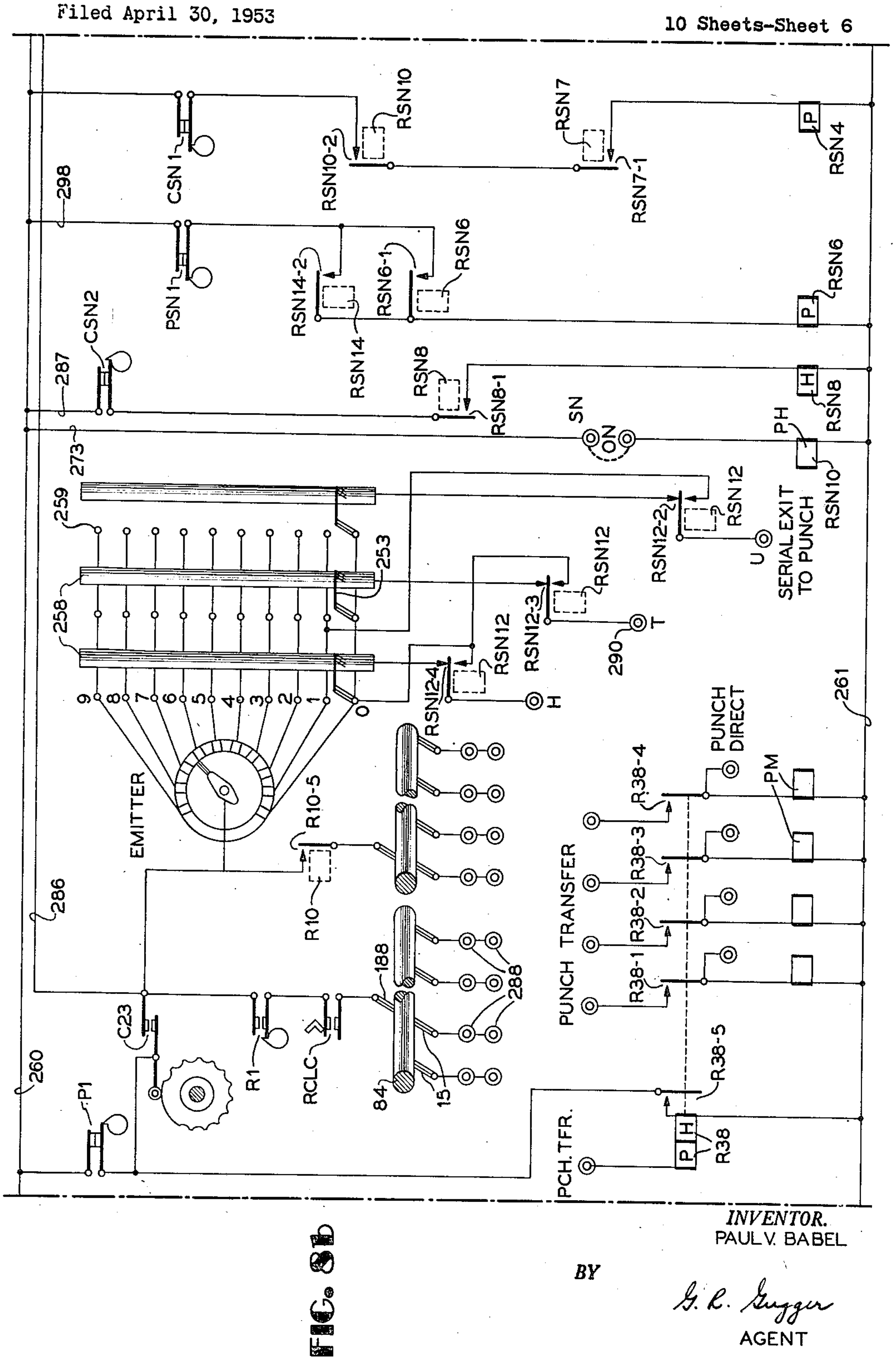
Figure 8C:
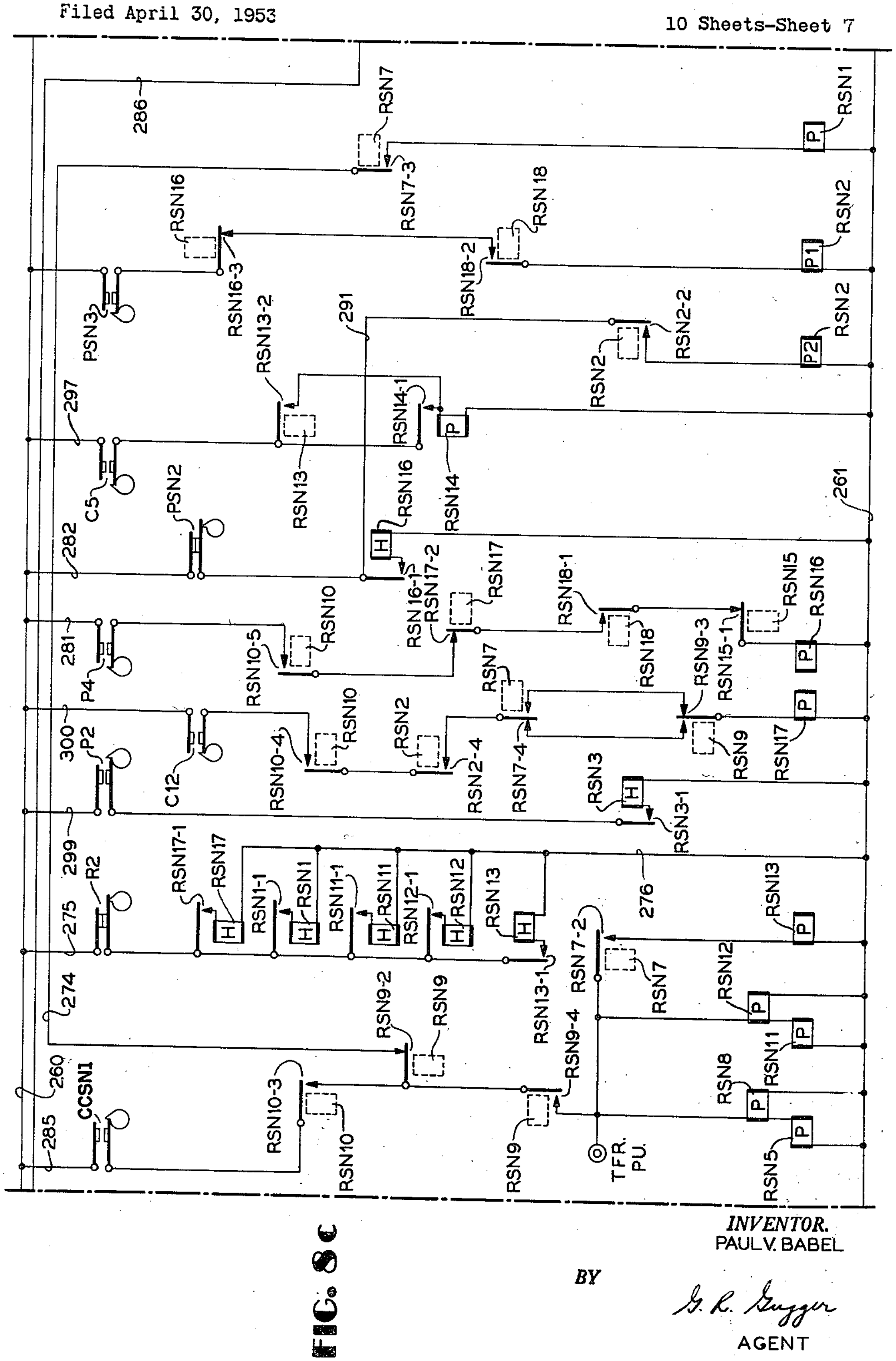
Figure 8D:
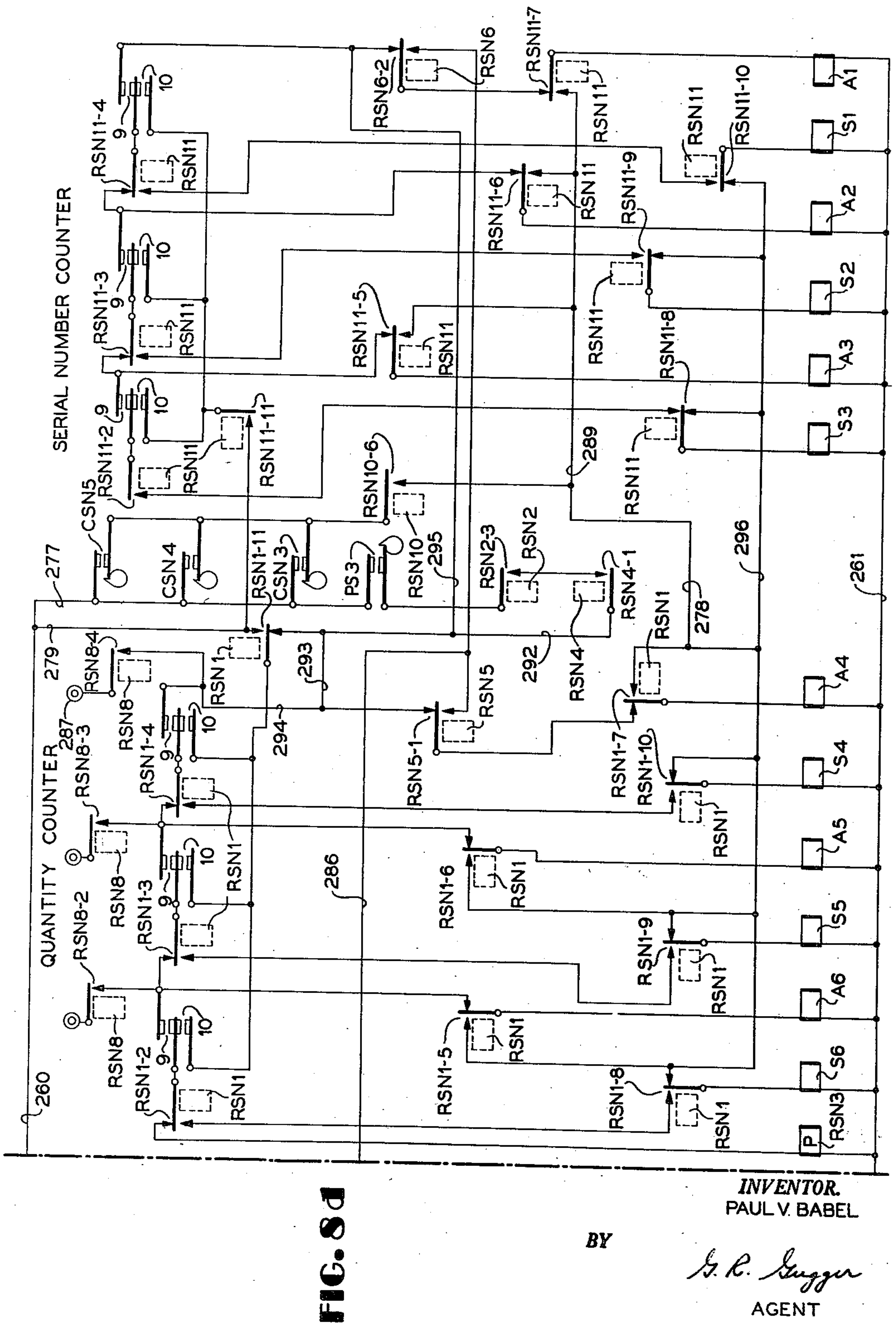

The various contact points of relay RSN1 are located in the quantity counter circuits shown in Fig. 8*d* and they function to reset the counter from 999 to 000. At 11 time in the first cycle cam contact CSN3 closes and a circuit is completed from line 260, wire 277, cam contact CSN3, now closed, contacts RSN10.6, now closed, wire 278, contacts RSN1.7, now transferred, the advance magnet A4 in the units order of the quantity counter and line 261. The same circuit also extends through the transferred contacts RSN1.6 and RSN1.5 to the advance magnets A5 and A6 in the tens and hundreds orders of the counter to start their respective register wheels turning. As each wheel reaches zero a circuit is completed from line 260, wire 279, contacts RSN1.11, now transferred, the 9–10 contacts in the units order, now closed on the 10's side, contacts RSN1.4, now transferred, contacts RSN1.10, now transferred, the stop magnet S4 in the units order and line 261. The same circuit extends through the 10's side of the 9–10 contacts in the tens and hundreds orders to energize the stop magnets S5 and S6. As a result the respective register wheels are declutched and the counter stands at 000.

At 7 time in the first cycle the first master card and first detail card will have advanced a sufficient amount to close their respective card levers RCL1 and DCL (Fig. 2) to complete circuits to energize control relays RSN7 and RSN9. Referring to Fig. 8*a*, the circuits extend from line 260, wire 262, die lever contacts DCLC, wire 280, the pick coil of relay RSN7, wire 263 and line 261. A circuit also extends from wire 262, the read card lever contacts RCLC–1, the pick coil of relay RSN9, wire 263 and line 261. The above traced circuits also energize the pick coils of control relays R1 and R6. With relay R1 energized a circuit is completed from line 260, cam contact P3, contacts R1–3, now closed, the pick coil of relay R3, wire 263 and line 261. Relay R3 holds through a circuit which extends from line 260, wire 262, die lever contact DCLC, contacts R1–4, now closed, contacts R3–1, now closed, the hold coil of relay R3, wire 263 and line 261. This same circuit extends from contacts R3–1, through contacts RSN10–1, now closed, the pick coil of relay RSN18, wire 263 and line 261. Relay RSN18 functions to control operation of the read feed as will be presently described.

*Second Cycle*

The second cycle is used to advance a card in the punch unit to the punch brush station, while the read feed remains idle. After the initial cycle, when the punch clutch magnet and the read clutch magnet are energized through the die card lever relay contacts R1–2 in the normal position, these contacts transfer and from then on the circuit to the read clutch magnet must pass through one of a series of parallel contact points shown in Fig. 8*a*. The normally closed contacts RSN10.7 and R7.6 are open at the end of the first cycle and neither the contacts RSN3.2 nor RSN16.2 is closed. Consequently, there is no circuit to the read clutch magnet for operation during the second cycle.

At 7.5 time in the second cycle relay RSN16 (Fig. 8*c*) is energized through a circuit extending from line 260, wire 281, cam contact P4, now closed, contacts RSN10.5, now closed, normally closed contacts RSN17.2, contacts RSN18.1, now closed, normally closed contacts RSN15.1, the pick coil of RSN16 and line 261. Relay RSN16 will hold until 12 time of the third cycle by a circuit which extends from line 260 (Fig. 8*c*), wire 282, cam contact PSN2, now closed, contacts RSN16.1, now closed, the hold coil of relay RSN16 and line 261. The energization of relay RSN16 closes contacts RSN16–2 (Fig. 8*a*) to establish a circuit from line 260, wire 270, contacts R24–1, now closed, contacts R1–2 transferred, wire 272, contacts RSN16–2, now closed, contacts R6–5 or R7–5, now closed, cam contact C2, read clutch magnet RCM and line 261. This same circuit also extends from the R24–1 contacts, contacts R6–2 transferred, wire 283, cam contact C1, the punch clutch magnet PCM and line 261. As a result, when the cam contacts C1 and C2 close at the beginning of the third cycle, the read feed and punch feed will operate together.

The relay R24 which was energized at the start of the first cycle through the depression of the start key will remain energized until approximately 9.2 time of the first cycle through a circuit which extends from line 260 (Fig. 8*a*), wire 284, cam contact P5, contacts R24–1, transferred, the hold coil of relay R24 and line 261. To prevent relay R24 from dropping out near the end of the first cycle, the start key is held for three cycles until the first detail card arrives at the punch brush station 19 where it operates a punch brush card lever PBCL (Fig. 2) to complete a circuit from line 260, wire 262, punch brush contacts PBC, now closed, the pick coil of relay R10, wire 263 and line 261. Energization of relay R10 completes a hold circuit for relay R24 which extends from line 260, wire 266, the normally closed contacts R18–1, punch stacker switch, contacts R6–4, now closed, contacts R10–2, now closed, contacts R1–1, now closed, contacts R4–2, now transferred contacts R24–1, now closed, the hold coil of relay R24 and line 261. The motor M will now keep running and cards will be fed as long as they are present or until a stop key is depressed. Depression of the stop key will complete a circuit from line 260, wire 264, the stop key, the hold coil of relay R18, wire 265 and line 261. The energization of the hold coil of relay R18 would open the contacts R18–1 to drop out relay R24 and thereby stop the machine.

When the contacts PBC closed, at approximately 13 time in the second cycle, relay RSN15 is energized through the contacts RSN10–8, now closed. Relay RSN15 will remain energized as long as cards are at the punch brush station and the contacts RSN15.1 (Fig. 8*c*) will open the circuit to the pick coil of relay RSN16. The effect of this is to defer further operation of the read feed after the third cycle until a read feed control relay RSN3 is energized on a completed 9'*s* contact test of the quantity counter.

*Third cycle*

The third cycle is used to enter the quantity of cards to be punched in the first group in the quantity counter, plus an added one for correction of the quantity counter. For the latter purpose a correction factor control relay RSN5 is energized by a circuit which extends from line 260 (Fig. 8*c*), wire 285, cam contact CCSN1 which closes at 14.4 of the third cycle since the read feed is operating for this cycle, contacts RSN10.3, now closed, contacts RSN9.4, now closed, the pick coil of relay RSN5 and line 261. As a result the units order magnet A4 is energized by a circuit which extends from line 260 (Fig. 8*b*), cam contacts P–1, cam contact C23, wire 286, contacts RSN5.1 (Fig. 8*d*), now transferred, normally closed side of contacts RSN1.7, advance magnet A4 and wire 261. At 11 time a circuit is completed from line 260, wire 277, cam contact CSN3, contacts RSN10.6, wire 278, the normally closed side of contacts RSN1.8, RSN1.9 and RSN1.10, the stop magnets S4, S5 and S6, and line 261. The only counter affected is the units order, the others being already stationary. This results in the addition of one in the units order and the counter moves from 000 to 001.

Relay RSN8 (Fig. 8c) is energized at the same time as relay RSN5 and is held until 8.5 time in the cycle by a circuit which extends from line 260 (Fig. 8b), wire 287, cam contact CSN2, contacts RSN8.1, now closed, the bold coil of relay RSN8 and line 261. Referring to Fig. 8d, the contacts RSN8.2, RSN8.3 and RSN8.4 now close to connect the quantity counter entry hubs 287 with the start magnets of the quantity counter and these start magnets are energized at times in the cycle depending upon the position of the holes in the quantity field of the first master card. A typical entry circuit would extend from line 360 (Fig. 8b), cam contact P–1, cam contact C23, cam contact R–1, read card lever RCLC, common brush 188, contact roller 84, hole in the card, brush 15, hubs 288, plug wire connection to entry hub 287 (Fig. 8d), contacts RSN8.4, now closed, the normally closed side of contacts RSN5.1, normally closed side of contacts RSN1.7, the advance magnet A4 in the units order and line 261. At 9 time a circuit passes from line 260, wire 277, cam contact CSN5, contacts RSN10.6, now closed, wire 278, the normally closed side of contacts RSN1.8, RSN1.9 and RSN1.10, the stop magnets S4, S5 and S6, and line 261. With the cards, which are the well-known type of IBM tabulating cards such as shown in Fig. 8 of Patent Re. 21,133, feeding 12 edge first, the counter wheels are stopped so that the 9's complement of the quantity stored in the quantity field of the master card is added to the 001 standing in the quantity counter. If the quantity punching on the first master card is 002 the complement 997 is added and the counter moves to 998.

The impulse that energizes the pick coil of relay RSN5 at 14.4 time of the third cycle also extends to a transfer pickup hub ( Fig. 8c), through a plug wire connection to a punch transfer hub (Fig. 8b), the pick coil of relay R38 and line 261. Relay R38 holds throughout the reading portion of the cycle by a circuit which extends from line 260 (Fig.8b), cam contact P–1, contacts R38–5, now closed, the hold coil of relay R38 and line 261. The contacts R38–1 through R38–4 now close to connect the punch magnets PM to the punch transfer hubs. The punch transfer hubs are plug wired to the hubs 288 and as a result any pre-punched data on the master card may be automatically reproduced into the first detail card in the customary manner through the reading brushes 15.

The third cycle (which is a read cycle) is also used to clear the serial number counter of any provious entry and to transmit a starting serial number of 001 to the punch magnets PM. Relays RSN11 and RSN12

(Fig. 8c) are energized in parallel with relays RSN5 and RSN8. These relays will hold up until 9.5 time in cycle three by a circuit which extends from line 260, wire 275, cam contact R2, contacts RSN11.1 and RSN12.1, now closed, the hold coils of relays RSN11 and RSN12, wire 276 and line 261. At 11 time a circuit is completed from line 260 (Fig. 8d), wire 277, cam contact CSN3, contacts RSN10.6, now closed, wire 289, the transferred side of contacts RSN11.5, RSN11.6 and RSN11.7, the advance magnets A1, A2, A3 of the serial number counter and line 261. As each register wheel reaches zero circuits are completed from line 260, wire 279, contacts RSN11.11, now closed, the 9–10 contacts now closed on the 10's side, contacts RSN11.2, RSN11.3 and RSN11.4, now closed, contacts RSN11.8, RSN11.9 and RSN11.10, now transferred, the stop magnets S1, S2 and S3, and line 261. At the end of reset time in cycle three, then, the serial number counter stands at 000.

The energization of relay RSN12 transfers contacts RSN12.2, RSN12.3 and RSN12.4 (Fig. 8b) connecting the exit hubs 290 of the serial number counter to terminals of a machine emitter EM which will emit a pulse for each cycle point of operation of the machine through C23 and P1. The hundreds and tens hubs are connected to the 0 emitter terminal and the units hub to the 1 emitter terminal. The exit hubs are plug wired to the punch direct hubs and as a result the serial number 001 will be punched in the first detail card.

At the end of the third cycle the first test and carry impulse is transmitted from line 260 (Fig. 8d), wire 277, cam contact PS3, closed at 13 time, and ultimately to the 9's contacts of the quantity counter. This pulse has to pass through the contacts RSN2.3 and RSN4.1. Relay RSN4 (Fig. 8b) has been energized each cycle, since RSN7.1 contacts are closed at 7 time in the first cycle and remain closed as long as cards are feeding in the punch feed. However, the closure of contacts RSN2.3 is delayed until the third cycle. In the first cycle when cam contact PSN3 closes (Fig. 8c), relay RSN18 has not been energized and contacts RSN18.2 are open. In the second cycle, when cam contact PSN3 closes, relay RSN16 is energized and contacts RSN16.3 are open. In the third cycle when cam contact PSN3 closes relay RSN16 is de-energized and a circuit is completed from PSN3 through normally closed contacts RSN16.3, contacts RSN18.2, now closed, the first pick coil of relay RSN2 and line 261. This relay will hold up temporarily through a circuit from line 260, wire 282, cam contact PSN2, wire 291, contacts RSN2.2, now closed, the second pick coil of relay RSN2 and line 261. At 13 time in the third cycle the punch brush card lever contact PBCL (Fig. 8*a*) is closed to complete a circuit through the contacts RSN10.8, contacts RSN2.1, now closed, the hold coil of relay RSN2 and line 261, Relay RSN2 will hold up now as long as cards continue to arrive at the punch brushes.

The test and carry impulse from PS3 (Fig. 8d) accordingly is transmitted through contacts RSN2.3 and RSN4.1, wire 292, wire 293, wire 294, to the stationary 9's contact of the units order. At this time the quantity counter stands at 998 and the units order 9's contact is open. As a result, for the example chosen, at the end of the third cycle a circuit is not yet completed to energize a read feed control relay RSN3 (Fig. 8d) indicating that the fourth cycle will be a punch cycle, but not a read cycle.

The test and carry impulse also passes from contacts RSN4.1, wire 292, wire 295, the normally closed side of contacts RSN6.2, normally closed side of contacts RSN11.7, advance magnet A1 in the units order of the serial number counter and line 261. This counter moves one step from 000 to 001 and is stopped at 14 time in the cycle by a circuit which extends from line 260 (Fig. 8*d*), wire 277, cam contact CSN4, contacts RSN10.6, now closed, wire 278, wire 296, normally closed side of contacts RSN11.10, the stop magnet S1 and line 261.

The test and carry impulse also passes from the contacts RSN4.1, wire 292, wire 293, normally closed side of contacts RSN5.1, normally closed side of contacts RSN1.7, advance magnet A4 in the units order of the quantity counter and line 261. This counter moves one step from 998 to 999 and is stopped by the cam contact CSN4 impulse at 14 time passing through the normally closed side of contacts RSN1.10, the stop magnet S4 and line 261.

Although the carry signal to the quantity counter arrives at the same time as the test pulse, the mechanical delay in operation of the units wheel of the quantity counter leaves the units 9's contacts still open at the time the test and carry impulse ends to insure that the fourth cycle will be a punch cycle, but not a read cycle.

*Fourth cycle*

At the beginning of the fourth cycle a correction impulse is transmitted to the units order counter of the serial number counter under control of a control relay RSN6. The energization of relay RSN6 is delayed until the end of the third cycle by a relay sequence starting with the energization of relays RSN12 and RSN13 (Fig. 8*c*) in parallel with relay RSN11 at the beginning of the third cycle. The circuit extends from line 260, wire 285, cam contact CCSN1, contacts RSN10.3, now closed, contacts RSN9.4, now closed, the pick coil of relay RSN12 and line 261. Also, from contacts RSN9.4, contacts RSN7.2, now closed, pick coil of relay RSN13 and line 261. These relays hold up until 9.5 time in the third cycle by a circuit which extends from line 260, wire 275, cam contact R2, contacts RSN12.1 and RSN13.1, now closed, the hold coils of relays RSN12 and RSN13, wire 276 and line 261.

At 8.6 time in cycle three, then, a circuit is completed from line 260, wire 297, cam contact C5, contacts RSN13.2, now closed, the pick coil of relay RSN14 and line 261. Relay RSN14 holds until 13.6 time through the same cam contact C5 and contacts RSN14.1, now closed. With relay RSN14 energized a circuit is completed at 13.3 time from line 260 (Fig. 8*b*), wire 298, cam contact PSN1, contacts RSN14.2, now closed, the pick coil of relay RSN6 and line 261. Relay RSN6 holds through the same contact PSN1 and the now closed contacts RSN6.1 until 12.5 time in the fourth cycle. With relay RSN6 energized, the correction impulse is transmitted at 12 time in cycle four through a circuit which extends from line 260 (Fig. 8*b*), cam contact P1, cam contact C23, wire 286, contacts RSN6.2 (Fig. 8*d*), now transferred, normally closed side of contacts RSN11.7, advance magnet A1 and line 261. At 11 time an impulse is transmitted from line 260, wire 277, cam contact CSN3, wires 289, 278 and 296, the normally closed side of contacts RSN11.10, the stop magnet S1 and line 261. Accordingly, the serial number counter moves one step and now stands at 002.

During the fourth cycle serial number 002 pulses are transmitted through emitter EM and the readout unit of the serial number counter (Fig. 8*b*), to the exit hubs 290, punch direct hubs and punch magnets, causing the second detail card to be punched 002. At 13 time in cycle four the test and carry impulse, previously described, passes through the 9's contacts of the quantity counter in series, since this counter now stands at 999, through the normally closed side of contacts RSN1.2, the pick coil of relay RSN3 and line 261. Relay RSN3 holds until 9.5 time in the next cycle by a circuit which extends from line 260 (Fig. 8*c*), wire 299, cam contact P2, contacts SN3.1, now closed, the hold coil of relay RSN3 and line 261. The energization of relay RSN3 is an indication that the quantity counter stands at 999 and that the required number of detail cards have been serial number punched. Referring to Fig. 8*a*, contacts RSN3–2 will close in time to transmit an impulse to the read clutch magnet RCM, which causes the read feed to operate in the next cycle to feed a new master card.

The test and carry impulse at 13 time in cycle four also passes through the previously described circuits to the units counter advance magnets of the quantity counter and the serial number counter, raising the former from 999 to 000 and the latter to 003.

With the read feed in operation in cycle five a new group of cards is initiated and the same sequence of events occurs as was just described for the first group.

In the case of single card groups it can be understood that if the quantity read from the quantity field of the first master card had been 001 the quantity counter would have been advanced on cycle three by the complement number 998, to 999. The test and carry impulse would then have initiated a read cycle at the end of cycle three to feed another master card in cycle four.

Provisions are made for controlling the operation of the machine should a mis-feed occur in either the read feed or the punch feed. The machine will automatically stop when either feed becomes exhausted or when either feed fails to feed a card. Usually the start key is depressed and if the mis-feed occurred in the read unit, the read feed will again attempt to feed a card.

If the read feed does not start, the mis-feed occurred in the punch unit. Cards may be removed from the punch magazine and the start key depressed to run out the punch unit only without clearing the counters making it possible to replace the detail cards back in the punch unit and continue serial number punching operations from the point where the mis-feed occurred.

If a simultaneous mis-feed occurs, cards are removed from both punch and read hoppers and all other cards are run out of the machine in the customary manner. The serial number punching operation is then restarted as a new run.

In the case of a mis-feed in the read unit the machine will stop due to the fact that there will be no card in position to close the read card lever contacts RCLC-1. Consequently relay R6 will drop out opening the R6-4 contacts in the hold circuit for relay R24. Contacts R24-3 will then open to drop out motor relay RHD-1 stopping the machine. Depression of the start key will again energize relay R-19 and the machine will start running again through the circuit which extends from line 260 (Fig. 8*a*), wire 266, contacts R18-1, normally closed, contacts R19-1, now closed, contacts R7-4, transferred, contacts RSN7-5 transferred, contacts R4-4 transferred, the pick coil of relay R24 and line 261. Relay R24 will hold and motor relay RHD-1 will be energized in the same manner as previously described. The read feed will operate until it catches up with the punch feed and then serial number punching will continue as previously described.

If the mis-feed occurs in the punch unit there will not be a card in position to close the die card lever contact DCLC and relay R1 will drop out. As a result, since contacts RSN9-1 and RSN10-10 are now open, contacts R1-1 open the hold circuit for relay R24 thereby effecting the drop out of relay RHD-1 and stopping the machine. In this case, however, depression of the start key will fail to start the machine running because the punch brush card lever contacts RSN15-3 are open and the punch hopper contacts R4-4 are transferred thereby opening the pick circuits for relay R24.

It is necessary, then, to remove the cards from the punch hopper to allow the punch hopper contacts R4-4 to transfer to normal position. As a result, a circuit is completed upon depression of the start key which extends from line 260, wire 266, normally closed contacts R18-1, contacts R19-1, now closed, contacts R7-4 transferred, normally closed contacts RSN7-5, contacts RSN9-5, now closed, contacts RSN10-9, now closed, contacts R4-4, the pick coil of relay R24 and line 261. The remaining cards will be run out of the punch feed while the read feed is idle. Since the mis-feed occurred in the punch feed the die card lever relay R1 will drop out and contacts R1-2 will complete a circuit to the punch clutch only. Also, at this time the read card lever contacts R6-2 are transferred to prevent the energization of the read clutch magnet RCM.

In order to resume operation of the machine so that serial number gang punching operations can continue on from the point where the mis-feed occurred, the last processed card of the preceding detail group is inserted ahead of the blank detail cards in the punch feed hopper. The start key is then depressed to complete a circuit from line 260, wire 266, normally closed contacts R18-1, contacts R19-1, now closed, contacts R7-4 transferred, normally closed contacts RSN15-3, contacts R4-4 transferred, the pick coil of relay R24 and line 261 to start the machine running. As was previously described the start key must be depressed for three cycles until the first detail card arrives at the punch brush station 19 in order to hold relay R24 energized for continuous operation of the machine. Since relay RSN15 is energized in the second cycle, as previously described, during the third cycle the RSN15-3 contacts are by-passed and the circuit to relay R24 passes through the transferred RSN7-5 contacts.

The punch feed unit is now operating again on a gang punch type of operation to complete the serial number punching for the group of cards in which the mis-feed took place. During the run-out and run-in operations after the mis-feed in the punch unit the quantity and serial number counters remain unchanged as a result of the opening up of the die card lever contact DCLC in the cycle in which the mis-feed occurred. Opening of the die lever contact drops out relay RSN7 and contacts RSN7.1 (Fig. 8*b*) open at approximately 9 time in the cycle to prevent the energization of relay RSN4. Accordingly, the test and carry impulse is prevented from being transmitted to the counters and the counters fail to move until the test and carry impulse becomes available when the first card of the re-entered group arrives at the punch brush station.

It is necessary for the machine to recognize on a run-in cycle whether it is an initial run-in to start the machine in operation or whether it is a run-in operation after mis-feed in the punch unit because on a run-in operation after mis-feed it is not desired to operate the read feed after running in the first two detail cards since the gang punching operations must be continued from the point where they stopped. For this purpose there is provided a control relay RSN17 which is energized when the die card lever contacts DCLC open due to a mis-feed. Relay RSN7 will drop out and a circuit will be completed from line 260 (Fig. 8*c*), wire 300, cam contact C12, contacts RSN10.4, now closed, contacts RSN2.4, now closed, normally closed side of contacts RSN7.4, contacts RSN9.3 transferred, the pick coil of relay RSN17 and line 261. Relay RSN17 holds through a circuit which extends from line 260, wire 275, cam contact R2, contacts RSN17.1, now closed, the hold coil of relay RSN17, wire 276 and line 261.

Contacts RSN17.2 now open to prevent the energization of relay RSN16 on a run-in following a mis-feed and accordingly the RSN16.2 contacts (Fig. 8*a*) remain open to prevent energization of the read clutch magnet RCM. The read clutch magnet RCM will remain de-energized until the required number of detail cards have been serial number punched and relay RSN3 is energized by a test and carry impulse to close contacts RSN3.2.

If both the read and punch feeds mis-feed simultaneously depression of the start key will not start the machine because in the pick circuit for relay R24 contacts R7-4 are transferred, contacts RSN15-3 are open, contacts R7-5 are normal and contacts RSN9-5 are normal preventing the energization of relay R24. The cards are removed from both hoppers and then upon depression of the start key a circuit can be completed to relay R24 through the normal contacts R7–4 and R4–4. The cards are run out of the machine and the serial number punch operation is started over as a new operation.

While there have been shown and described and pointed out the fundamental novel features of the invention as applied to a preferred embodiment, it will be understood that various omissions and substitutions and changes in the form and details of the device illustrated and its operation may be made by those skilled in the art, without departing from the spirit of the invention. It is the intention, therefore, to be limited only as indicated by the scope of the following claims.

What is claimed is:

1. In a machine of the class described, means to feed a succession of records having designations representing the quantity of separate records to be serially number punched, means to sense said designations one record at a time, a quantity counter, a serial number counter, means to enter a unit in each of said counters for each of said separate records, means controlled by the feeding of one of said first named records to cause resetting of said quantity counter, means controlled by the sensing means for entering the quantity in the quantity counter when one of said first records is sensed, a record perforating mechanism, a cyclically operable emitter, means for initially placing said perforating mechanism under control of said emitter to punch the first of said separate records with a predetermined intial serial number, means for setting said serial number counter one unit higher than said initial number, means for thereafter placing said perforating mechanism under control of said serial number counter to serial number punch a succession of said separate records beginning with the next higher serial number above said initial number, and means controlled by the quantity counter when the last record of said separate series is serial number perforated to render the feeding means effective to feed another of the first named records to the sensing means.

2. In a machine of the class described, means to feed a succession of records having designations representing the quantity of separate records to be serially number punched, means to sense said designations one record at a time, a quantity counter, a serial number counter, means to enter a unit in each of said counters for each of said separate records, means controlled by the feeding of one of said first named records to cause resetting of said counters, means controlled by the sensing means for entering the quantity in the quantity counter when one of said first records is sensed, means to perforate a series of separate records, read-out means associated with the serial number counter for controlling said perforating means, a cyclically operable emitter, means rendered effective under control of said feeding means to initially place said read-out means under control of said emitter to cause the punching of a predetermined initial serial number in the first of the series of separate records, said last named means becoming later effective to place said read-out means under control of the serial number counter to cause the punching of succeeding separate records of said series with succeeding serial numbers, and means controlled by the quantity counter when the last record of said separate series is serial number perforated to render the feeding means effective to feed another of the first named records to the sensing means.

3. In a machine of the class described, means to feed a succession of records having quantity designations representing the quantity of separate records to be serially number punched and other data designations, means to sense said designations one record at a time, a quantity counter, a serial number counter, means to enter a unit in each of said counters for each of said separate records, means controlled by the feeding of one of said first records is sensed, a record perforating mechanism, means controlled by the feeding of said first named record for placing said perforating mechanism under control of said sensing means to reproduce said other data designations in the first of said separate records, means controlled by named records to cause resetting of said quantity counter, means controlled by the sensing means for entering the quantity in the quantity counter when one of said first the feeding of said first named record to cause resetting of said serial number counter as said data designations are being reproduced, a cyclically operable emitter, means for placing said perforating mechanism under control of said emitter to punch said first one of said separate records with a predetermined initial serial number, means for setting said serial number counter one unit higher than said initial number, means for thereafter placing said perforatnig mechanism under control of said serial number counter to serial number punch a succession of said separate records beginning with the next higher serial number above said initial number, and means controlled by the quantity counter when the last record of said separate series is serial number perforated to render the feeding means effective to feed another of the first named records to the sensing means.

4. In a machine for serial number punching record cards, punching means, means to feed cards singly to said punching means, a cyclincally operable emitter for emitting digit representing impulses, means connecting said punching means to said emitter to cause said punching means to punch a designation of an initial serial number in a first card of a series, a serial number counter, means for setting said counter to a number of a serial number sequence next following said initial number, means to switch the control of said punching means from said emitter to said serial number counter after said initial number has been punched, means to change the serial number counter to a setting corresponding to the next number of the serial number sequence after each card is punched, quantity control means to switch the control of said punching means back to said emitter when a predetermined number of cards have been serial number punched, and means controlled by said quantity control means for resetting said serial number counter.

5. In a machine for serial number punching record cards, punching means, means to feed cards singly to said punching means, a cyclically operable emitter for emitting digit representing impulses, means connecting said punching means to said emitter to cause said punching means to punch an initial serial number designation of 001 in a first card of a series, a serial number counter, means for setting said counter to the next higher serial number of 002, means to switch the control of said punching means from said emitter to said serial number counter after said initial number has been punched, means to change the serial number counter to a setting corresponding to the next number of the serial number sequence after each card is punched, quantity control means to switch the control of said punching means back to said emitter when a predetermined number of cards have been serial number punched, and means controlled by said quantity control means for resetting said serial number counter.

6. In a machine of the class described having means to feed a succession of records carrying designations representing the quantity of separate records to be serially number punched and means to feed a succession of said separate records for each of said first named records, the combination of, a quantity counter, a serial number counter, means to enter a unit in each of said counters for each of said separate records, a cyclically operable emitter, means for sensing and entering the quantity designations from one of said first records into said quantity counter, a record perforating mechanism, means for initially placing said perforating mechanism under control of said emitter to punch the first of said separate records with a predetermined initial serial number, means for setting said serial number counter one unit higher than said initial number, means for thereafter placing said perforating mechanism under control of said serial number counter to serial number punch a succession of said separate records beginning with the next higher serial number above said initial number, means rendered operable upon a mis-feed of any one of said separate records for disabling both said feeding means, means for restarting only said second named feeding means after said mis-feed to run out said separate records, means for again starting said second named feeding means to run in said separate records after proper rearrangement of same, and means for preventing operation of said counters only during said runout and run-in operations so that serial number punching may continue on from the last one of said separate records that was serial number punched.

7. In a machine of the class described having means to feed a succession of records carrying designations representing the quantity of separate records to be serially number punched and means to feed a succession of said separate records for each of said first named records, the combination of, a quantity counter, a serial number counter, means to enter a unit in each of said counters for each of said separate records, a cyclically operable emitter, means for sensing and entering the quantity designations from one of said first records into said quantity counter, a record perforating mechanism, means for initially placing said perforating mechanism under control of said emitter to punch the first of said separate records with a predetermined initial serial number, means for setting said serial number counter one unit higher than said initial number, means for thereafter placing said perforating mechanism under control of said serial number counter to serial number punch a succession of said separate records beginning with the next higher serial number above said initial number, means controlled by the quantity counter when the last record of said separate series is serial number perforated to render said feeding means effective to feed another of the first named records to the sensing means and another of said separate records to the perforating mechanism, means rendered operable upon a mis-feed of any one of said separate records for disabling both said feeding means, means for restarting only said second named feeding means after said mis-feed to run-out said separate records, means for again starting said second named feeding means to run in said separate records after proper rearrangement of same, means for distinguishing between a normal run-in operation and a run-in operation due to a mis-feed, and means controlled by said last named means for controlling operation of said first named feeding means.

References Cited in the file of this patent

UNITED STATES PATENTS

| | | |
|---|---|---|
| Re. 21,133 | Lake | June 27, 1939 |
| 2,377,791 | Lake | June 5, 1945 |
| 2,531,873 | Daly | Nov. 28, 1950 |
| 2,645,994 | Carroll | July 21, 1953 |